United States Patent [19]

Farrell

[11] 4,005,969
[45] Feb. 1, 1977

[54] APPARATUS FOR LONGITUDINAL STRETCH FOR BLOW MOLDING

[75] Inventor: John J. Farrell, Green Brook, N.J.

[73] Assignee: Farrell Patent Company, Greenbrook, N.J.

[22] Filed: Jan. 31, 1975

[21] Appl. No.: 545,923

Related U.S. Application Data

[62] Division of Ser. No. 441,811, Feb. 12, 1974, Pat. No. 3,905,738.

[52] U.S. Cl. .................... 425/389; 425/DIG. 208; 425/DIG. 209; 425/DIG. 216
[51] Int. Cl.² .......................................... B29C 17/07
[58] Field of Search ......... 425/DIG. 208, DIG. 209, 425/DIG. 215, DIG. 216, 242 B, 326 B, 387 B, 389, 469

[56] References Cited

UNITED STATES PATENTS

| | | | |
|---|---|---|---|
| 720,718 | 2/1903 | Maddock et al. ................. | 425/389 |
| 3,032,823 | 5/1962 | Sherman ........................ | 425/387 B |
| 3,305,890 | 2/1967 | Senior et al. ............. | 425/DIG. 208 |
| 3,439,380 | 4/1969 | Scefluth .................... | 425/DIG. 216 |
| 3,651,180 | 3/1972 | Glueckert ......................... | 425/389 |
| 3,776,991 | 12/1973 | Marcus .................... | 425/DIG. 215 |
| 3,781,395 | 12/1973 | Uhlig ........................ | 425/DIG. 215 |
| 3,865,530 | 2/1975 | Jesselallee et al. ....... | 425/DIG. 216 |

*Primary Examiner*—Richard B. Lazarus
*Attorney, Agent, or Firm*—Marvin Feldman

[57] ABSTRACT

This injection blow molding machine has special provision for maintaining the plastic of a parison on a core rod at the orientation temperature of the plastic; and stretching the plastic of the parison lengthwise of the core rod for orientation in the direction of one axis without any substantial increase in the diameter of the parison. After this orientation in one axis, the temperature is controlled to maintain an orientation temperature, and the plastic of the parison is then blown to a larger diameter so as to obtain orientation in another axis for "bi-axial orientation". The core rod is covered by an elastic balloon, and provision is made for obtaining flow of the plastic on the core rod lengthwise of the rod during the first orientation operation.

9 Claims, 3 Drawing Figures

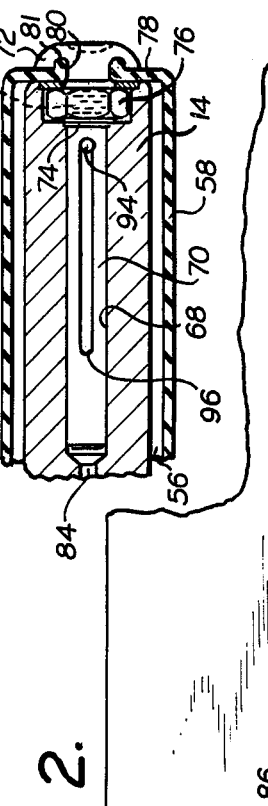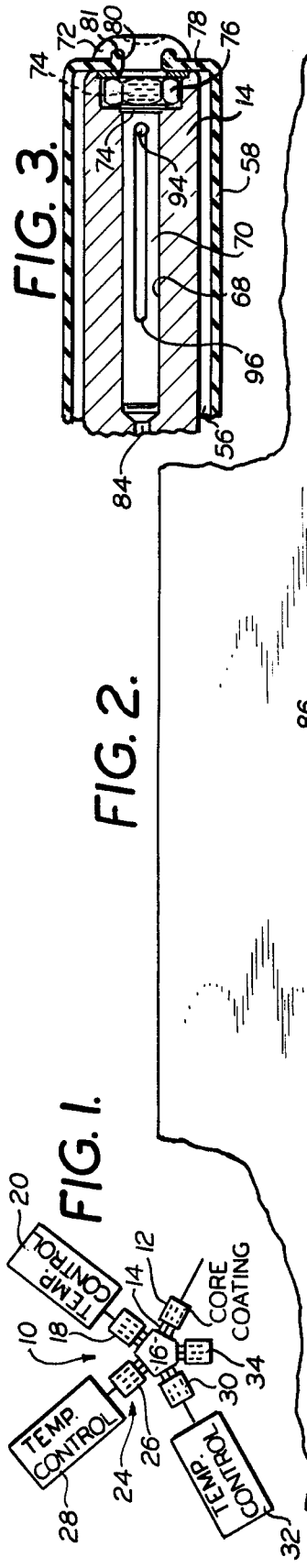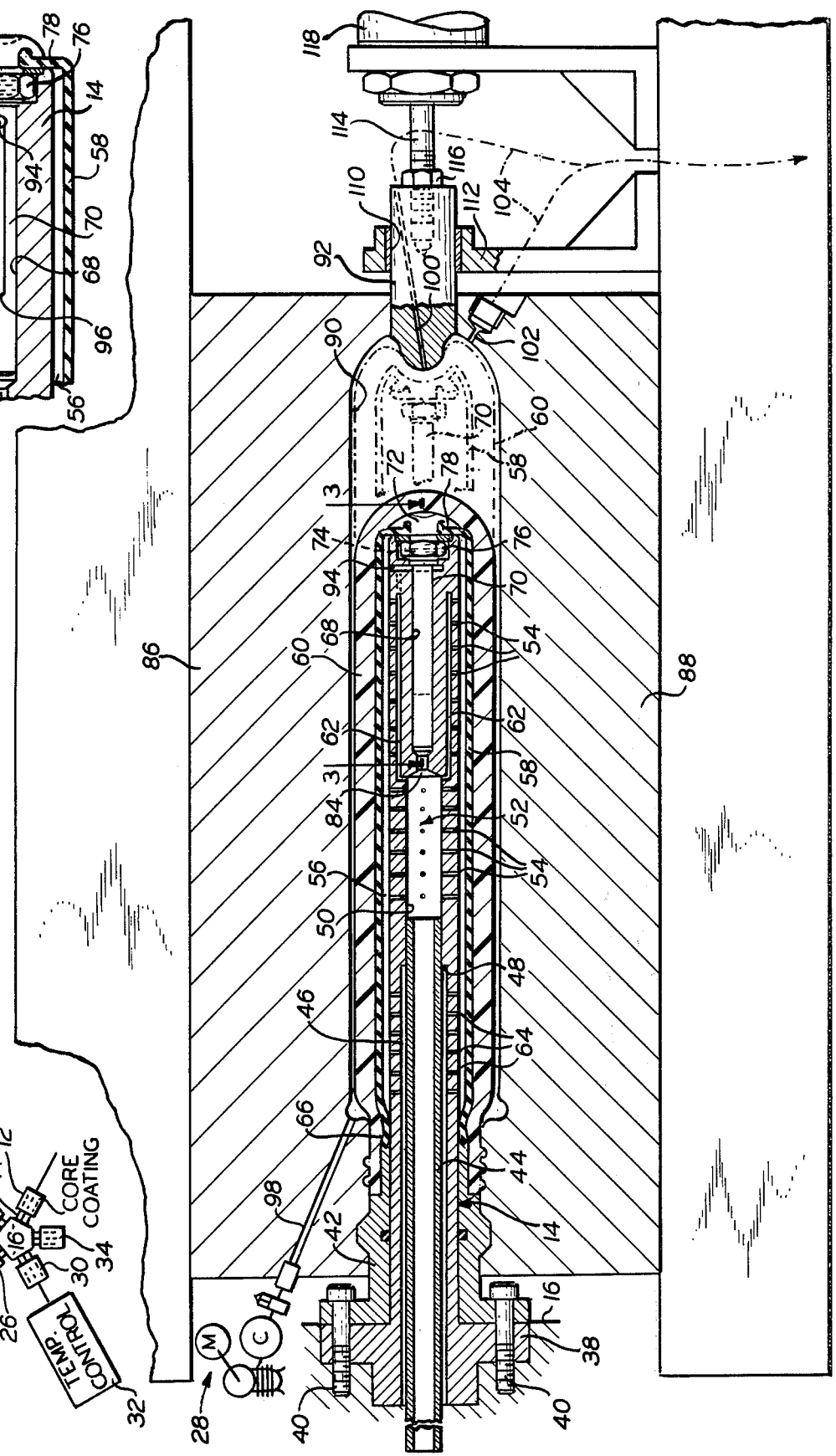

APPARATUS FOR LONGITUDINAL STRETCH FOR BLOW MOLDING

This is a division of application Ser. No. 441,811, filed Feb. 12, 1974, now U.S. Pat. No. 3,905,738, issued Sept. 16, 1975.

BACKGROUND AND SUMMARY OF THE INVENTION

When articles are made of plastic on blow molding machines, the plastic is substantially stronger if the plastic material has been stretched in two directions at right angles to one another. This results in "bi-axial orientation". With some plastics bi-axial orientation is necessary in order to obtain a clear transparent article. With other materials the bi-axial orientation substantially increases the strength of the final product even though no clear transparency can be obtained.

This invention provides improved apparatus and method for making bi-axially oriented products by blow molding. In order to obtain more flexibility in handling the parison on the core rod, this invention uses a core rod which is covered with an elastic balloon. This balloon hugs the core rod when the balloon is deflated and the parison is applied over the surface of the balloon in the injection mold.

The core rod is transferred from the injection mold to a conditioning station where the plastic of the parison is brought to orientation temperature; that is, the temperature at which solidification begins. The parison is then stretched in the direction of its length by increasing the length of the core rod and stretching the balloon lengthwise of the core rod with the plastic material coated over the balloon.

This stretching operation is performed in a mold with special provision for permitting movement of the plastic in the mold lengthwise of the core rod and with no contact, or only light contact, between the plastic and the mold surfaces.

Following this initial stretching, the core rod and parison are moved to a second conditioning station and then to a blowing mold in which the parison is preferably blown to its final shape.

Other objects, features and advantages of the invention will appear or be pointed out as the description proceeds.

BRIEF DESCRIPTION OF DRAWING

In the drawing, forming a part hereof, in which like reference characters indicate corresponding parts in all the views:

FIG. 1 is a diagrammatic top plan view of blow molding apparatus for obtaining bi-axial orientation in accordance with this invention;

FIG. 2 is a greatly enlarged sectional view through the mold in which the parison is stretched to provide orientation in one axis; and FIG. 3 is a fragmentary, enlarged, sectional view taken on the line 3—3 of FIG. 2.

DESCRIPTION OF PREFERRED EMBODIMENT

FIG. 1 shows a blow molding machine 10 which has five stations. The first station is an injection station 12 in which plastic is injected into a mold cavity to apply a parison to core rods 14 which extend from an indexing head 16 that supports the core rods. The core rods 14 are supported from the indexing head 16 in the usual manner.

After the injection step, the injection mold 12 opens and the indexing head moves the core rods to a second station which is a conditioning station 18 which is located at an angle of 72°, around the axis of rotation of the indexing head, with respect to the injection station 12.

The apparatus shown in FIG. 1 being a five position machine, each station is located at an angle of 72° with respect to each adjacent station and the indexing head 16 moves through an angle of 72° each time the core rods 14 are to be shifted from one station to the next.

At the conditioning station 18, there are means for bringing the parison to its orientation temperature by use of fluid from temperature control apparatus 20. The construction of the conditioning station 18 and its temperature control means 20 can be conventional and no further illustration of it is necessary for a complete understanding of this invention. The temperature to which molten plastic must be brought in order to obtain orientation by stretching of the plastic is well known and while it differs from one plastic to another, it is always the temperature at which the molten material begins to solidify.

With the next angular movement of the indexing head 16, the core rods are moved from the first conditioning station 18 to a second conditioning station 24 which includes a mold 26 and temperature control means 28. The construction and operation of this second conditioning station is the principal concern of the present invention and it will be described in more detail in connection with FIGS. 2 and 3. For the present it is sufficient to understand that the parison is stretched lengthwise of the core rod, while maintained at orientation temperature, in the mold 26 at the second conditioning station 24.

The core rods are moved next to a blowing station 30 having a mold in which the parison is blown, preferably to its final contour, while its temperature is maintained at approximately the orientation temperature by temperature control means 32.

Beyond the blowing station, the core rods are transferred to a stripper station 34 at which blown articles are stripped from the core rod in a conventional manner.

FIG. 2 shows a core rod 14 which has a shoulder 38 at one end for connecting the core rod to the indexing head 16 by screws 40 which tread into the face of the indexing head 16. These screws 14 also hold a hub 42 securely connected to the indexing head 16. This hub 42 extends around the neck end of the core rod 14.

The core rod is hollow but not of uniform inside diameter. For a portion of the length of the core rod there is a tube 44 which is concentric with the longitudinal axis of the interior of the core rod and this tube 44 has an outside diameter substantially less than the inside diameter of the core rod along most of the length of the tube 44 within the core rod. There is provided, therefore, an annular chamber 46 between the outside surface of the tube 44 and the inside surface of the core rod for a substantial portion of the core rod length, including all of the right hand or neck portion of the core rod in FIG. 2. Near the right hand end of the tube 42 there is a shoulder 48 at which the interior diameter of the core rod decreases to a bore 50 which has an inside diameter substantially equal to the outside diameter of the tube 44. The end of the tube 44 extends into this bore 50 with a press fit or other rigid connection of the tube 44 with the core rod 14.

Beyond the end of the tube 44 there is a chamber 52 within the core rod 14 and this chamber 52 has passages 54 opening through its side walls for flow of fluid from the chamber 52 into an annular space 56 between the outside surface of the core rod 14 and an inside surface of an elastic balloon 58 which covers the core rod. A plastic parison 60 coats the outside of the balloon 58.

When the core rod 14 is in the injection mold, the balloon 58 is fully deflated and hugs the outside surface of the core rod 14. The parison 60 is applied to the balloon 58 while the balloon is hugging the core rod and the initial expansion of the balloon to form the annular space 56 is obtained by a slight initial blowing of the balloon in the first conditioning station 18.

The purpose of this initial blowing is to permit the circulation of temperature controlling fluid along the inside surface of the balloon 58 for temperature control of the parison 60 but this is the subject matter of another patent application and it is mentioned here merely for the purpose of answering the question as to where the annular space 56 was first produced.

The chamber 52 does not extend all the way to the end of the core rod but the passages 54 are spaced along the length of the core rod for a substantial distance beyond the chamber 52 and these additional passages 54 are supplied with fluid from the chamber 52 through headers 62.

Temperature controlling fluid, for obtaining the necessary orientation temperature of the parison 60, is circulated in contact with the inside surface of the balloon 58. This circulation is obtained by passing the fluid, preferably liquid, through the tube 44 into the chamber 52 and from the chamber 52 through the passages 54 into the annular space 56 at various locations corresponding to the passages 54 which are spaced not only longitudinally along the length of the core rod but also axially around the circumference of the core rod. The fluid discharged into the space 56 from the passages 54 flows lengthwise of the space 56, toward the left in FIG. 2, and exhausts from the annular space 56 through inlet passages 64 leading from the annular space 56 through the wall of the core rod and into the annular space 46 within which the fluid flows toward the left and into an appropriate exhaust passage in the indexing head 16.

The next portion 56 has its end bonded to the hub 42; and in the construction illustrated, the parison 60 is applied over a part of the hub 42 beyond the balloon 58.

At the free end of the core rod 14, that is, the end remote from the indexing head 16, there is a longitudinal bore 68 and there is a core rod extension element 70 which has a stem portion that slides in the bore 68 like a piston in a cylinder. This core rod extension element 70 has a rounded head 72 and a threaded portion 74 adjacent to the rounded head 72 with a nut 76 that screws over the threads 74 to a clamp a washer 78 against the portion of the balloon 58 that contacts with the under side of the rounded head 72. This construction is shown most clearly in FIG. 3 which is on a slightly larger scale than FIG. 2. The parison 60 is omitted in FIG. 3 for clearer illustration.

The end of the balloon 58, remote from its neck portion, has an opening 80 through which the core rod extension element 70 extends. Around the edges of the opening 80, the balloon has a lip 81 which fits into a complementary recess in the back surface of the rouned head 72. The lip 81 is clamped into this recess by the washer 78 when the nut 76 is screwed up against the washer 78.

The pressure of the fluid in the annular space 56 tends to expand the balloon 58 and parison 60 to a larger diameter and also tends to increase the length of the balloon since the core rod extension element 70 can move longitudinally with respect to the otherwise fixed part of the core rod. The fluid pressure within the chamber 52, however, is substantially higher than that in the annular space 56 because of the pressure drop through the passages 54. To provide greater force for stressing the balloon 58 and parison 60, there is a communication passage 84 between the chamber 52 and the left hand end of the bore 68. Pressure exerted through this passage 84, against the end of the core rod extension element 70 pushes the extension element 70 toward the right in the bore 68 with a cylinder-and-piston action to move the core rod extension element 70 toward the right in FIG. 2, as indicated by the dotted line position, and thereby stretch the parison 60.

This stretching of the balloon and parison takes place in a mold having an upper section 86 and a lower section 88 which move toward and from one another in accordance with conventional practice. When the mold parts 86 and 88 are in contact with one another; that is, the mold is closed, they form a mold cavity 90 which is slightly larger in diameter than the parison 60 when the parison is introduced into the mold cavity 90. The cavity 90, however, is substantially longer than the parison 60, as will be evident from FIG. 2. The parison can expand only slightly in the cavity 90 without coming in contact with the walls of the cavity; but the parison 60 can be stretched for a substantial distance, as indicated by the dot and dash lines in FIG. 2.

There is a plunger 92 which extends through an opening in the end of the cavity 90 and the end face of this plunger 92 is shaped to produce the desired set or contour for the parison 60 at the end of the stretching operation. The balloon 58 tends to expand beyond the rounded head 72 as the result of pressure within the balloon, but the rounded head 72 restrains this expansion.

It is essential, however, to prevent the core rod extension element 70 from moving all the way into contact with the end of the cavity 90; that is, with contact with the end face of the plunger 92.

In order to limit the stroke of the core rod extension element 70, there is a pin 94 extending through a fixed portion of the core rod 14 and through a slot 96, best shown in FIG. 3, in the stem or piston portion of the core rod extension element 70.

In addition to the control of the temperature of the parison 60 by circulating temperature controlling fluid through the annular space 56 within the balloon 58, the apparatus as shown in the drawing also circulates cooling fluid through the clearance between the outside surface of the parison 60 and the inside surface of the cavity 90. FIG. 2 shows temperature control apparatus 28 diagrammatically and in position to deliver the temperature controlling fluid through a passage 98 in the upper mold section 86. There are exhaust passages 100 and 102 at the other end of the cavity 90 for the flow of temperature controlling fluid from the cavity 90 through passages indicated diagrammatically by the reference character 104 and these passages preferably lead to self-releasing regulators, that is, regulators that permit pressure to build up to a certain value and then reduce the pressure in accordance with the adjustment of the regulators.

The circulation of the pressure controlling fluid from the passage 98 to the exhaust passages 100 and 102 also serve another purpose. The pressure of this fluid in the clearance between the parison 60 and the surface of the cavity 90 tends to limit the expansion of the parison 60 in a radial direction. The pressure of this fluid is correlated with the pressure within the balloon 58 so that the plastic of the parison 60 will not be expanded into firm contact with the surface of the mold cavity 90 until the parison has been stretched to the desired extent for providing axial orientation in a longitudinal direction. It will be evident that if the parison 60 were pressed into firm contact with the mold cavity 90 before the parison had been stretched, then friction of the parison against the surface of the cavity 90 would reduce the amount of stretching of the plastic near the outside surface of the parison while that on the inside surface would stretch more easily and the orientation of the parison would not be uniform.

The plunger 92 slides in a bearing 110 carried by a fixed frame 112. The plunger 92 is connected with a piston rod 114 which threads into the plunger and is held by a lock nut 116. This piston rod 114 extends from a cylinder 118 which is representative of means for moving the plunger 92 in and out with respect to the mold cavity as desired. Other plungers 92 can be substituted for that shown depending upon the desired contour of the end of the parison when it leaves the mold cavity 90 and the plunger 92 is also shaped so that it stretches the portion of the parison which extends across the end of the core rod and thereby provides orientation of the end of the parison as well as its side walls. The cylinder 118 moves the plunger 92 as necessary to provide stretch of the end plastic of the parison comparable to that provided by the lengthening of the core rod.

The preferred embodiment of the invention has been illustrated and described, but changes and modifications can be made and some features can be used in different combinations without departing from the invention as defined in the claims.

I claim:

1. Blow molding apparatus comprising in combination, a core rod, an elastic balloon attached to the core rod at the neck end thereof, the balloon hugging the core rod when the balloon is in a deflated condition preparatory to having a parison applied over the outside surface of the balloon, and an end portion of the core rod remote from the neck end of the rod and that moves axially to extend the length of the core rod, means on said core rod to provide fluid passage between the core rod and balloon during core rod extension so that the balloon and the parison thereon are stretched lengthwise with the parison diameter and balloon diameter being substantially unchanged.

2. The blow molding apparatus described in claim 1 characterized by the balloon being connected to said end portion of the core rod by connecting means that extend through the end of the balloon and that are covered by the parison.

3. The blow molding apparatus described in claim 1 characterized by the movable portion of the core rod including a stem that slides longitudinally in a guide in the fixed portion of the core rod, and an abutment on the fixed portion of the core rod in position to limit the extent of movement of the movable portion.

4. The blow molding apparatus described in claim 3 characterized by the stem and guide having confronting bearing surfaces, one of said surfaces having a slot therein and the other having an abutment extending therefrom and into said slot for limiting the stroke of the movable part of the core rod in a direction that stretches the balloon and parison lengthwise.

5. The blow molding apparatus described in claim 1 characterized by the core rod being carried by one face of an indexing head that has a plurality of other faces that carry similar core rods and that move each rod successively to an injection station, and means for actuating the movable portions of the core rods when each core rod is in the conditioning station.

6. A blow molding apparatus comprising a core rod, an elastic balloon attached to the core rod at the neck end thereof, said balloon in the deflated condition hugging the core rod and having an exterior surface onto which a parison is injection molded, said core rod comprising an axially movable end portion remote from the neck end of the core rod, in that the balloon and parison thereon are stretched in the axial direction, means on said core rod to provide fluid passage to a space between the core rod and balloon, and means to provide circulation of a temperature controlling fluid from the core rod through said space and out through said core rod to bring said parison to its orientation temperature, prior to stretching said parison, whereby the stretched parison is axially oriented while the parison diameter remains substantially unchanged.

7. The apparatus of claim 6, said fluid passage means on said core rod comprising first plurality of passages for fluid inlet to said space and a second plurality of passages for fluid outlet from said space.

8. A blow molding apparatus comprising a core rod onto which a parison is supplied, said core rod comprising an axially extensible end portion for axially stretching the parison, said core rod being formed with fluid passage means being formed so that fluid is supplied through said core rod and circulated through a space between said core rod and parison and then out through said core rod, at a first pressure, and said fluid passage means being further formed so that fluid is supplied through said core rod axially extend said end portion at a second pressure greater than said first pressure.

9. The blow molding apparatus of claim 8 further comprising an elastic balloon covering the core rod and wherein said parison contacts the exterior surface of the balloon, and wherein the balloon is axially stretched with the parison.

* * * * *